United States Patent
Roev et al.

(10) Patent No.: US 10,199,701 B2
(45) Date of Patent: Feb. 5, 2019

(54) CATHODE FOR LITHIUM AIR BATTER, LITHIUM AIR BATTERY INCLUDING THE SAME, AND METHOD OF MANUFACTURING CATHODE FOR LITHIUM AIR BATTERY

(71) Applicant: Samsung Electronics Co., Ltd., Suwon-si, Gyeonggi-do (KR)

(72) Inventors: Victor Roev, Suwon-si (KR); Hyunjin Kim, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 430 days.

(21) Appl. No.: 15/161,538

(22) Filed: May 23, 2016

(65) Prior Publication Data

US 2017/0155178 A1    Jun. 1, 2017

(30) Foreign Application Priority Data

Nov. 27, 2015    (KR) .................. 10-2015-0167505

(51) Int. Cl.
*H01M 4/96*    (2006.01)
*H01M 12/08*    (2006.01)

(52) U.S. Cl.
CPC ............. *H01M 12/08* (2013.01); *H01M 4/96* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 8,269,197 | B2 | 9/2012 | Goer et al. |
| 8,366,970 | B2 | 2/2013 | Gilmartin et al. |
| 8,563,168 | B2 | 10/2013 | Balsara et al. |
| 8,580,431 | B2 | 11/2013 | Roev et al. |
| 2011/0206994 | A1 | 8/2011 | Balsara et al. |
| 2016/0079590 | A1 | 3/2016 | Roev et al. |

FOREIGN PATENT DOCUMENTS

| | | | |
|---|---|---|---|
| JP | 2009102179 A | | 5/2009 |
| JP | 2010-015895 | * | 1/2010 |
| JP | 2012041665 A | | 3/2012 |
| JP | 2014172968 A | | 9/2014 |

(Continued)

OTHER PUBLICATIONS

Ishii et al., "Facile Preparation of Ionic Liquid containing Silsesquioxane Framework", Bull. Chem. Soc. Jpn., vol. 87, No. 1, 2014, pp. 155-159.

(Continued)

*Primary Examiner* — Jonathan Crepeau
(74) *Attorney, Agent, or Firm* — Cantor Colburn LLP

(57) ABSTRACT

A cathode for a lithium air battery includes a carbonaceous material, the carbonaceous material including: a carbonaceous core; and a coating layer on the carbonaceous core, wherein the coating layer includes an amorphous polysilsesquioxane ionic liquid having a viscosity of at least 0.2 milliPascal-seconds as measured as a 10 weight percent solution in acetone at 30° C. at 30° C. Also a lithium air battery including the cathode, and a method of manufacturing the cathode.

20 Claims, 9 Drawing Sheets

(56) References Cited

FOREIGN PATENT DOCUMENTS

| JP | 2014221737 A | 11/2014 |
|---|---|---|
| KR | 1020130014650 A | 2/2013 |
| KR | 1020140125143 A | 10/2014 |

OTHER PUBLICATIONS

Kitaura et al., "Electrochemical performance and reaction mechanism of all-solid-state lithium-air batteries composed of lithium, Li1+xAlyGe2—y(PO4)3 solid electrolyte and carbon nanotube air electrode*", Energy & Environmental Science, vol. 5, 2012.

Kitaura et al..,"All-solid-state lithium-oxygen battery with high safety in wide ambient temperature range", Scientific Reports, Nature, 2015, pp. 1-8.

Li et al., "MnO2 nanoflackes coated on multi-walled carbon nanotubes for rechargeable lithium-air batteries", Electrochemistry Communications, vol. 13, 2011, pp. 698-700.

Li et al., "The pursuit of rechargeable solid-state Li-air batteries", Energy & Environmental Science, vol. 6, 2013, pp. 2302-2311.

* cited by examiner

CATHODE FOR LITHIUM AIR BATTER, LITHIUM AIR BATTERY INCLUDING THE SAME, AND METHOD OF MANUFACTURING CATHODE FOR LITHIUM AIR BATTERY

CROSS-REFERENCE TO RELATED APPLICATION

This application claims the benefit of and priority to Korean Patent Application No. 10-2015-0167505, filed on Nov. 27, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode for lithium air batteries, lithium air batteries including the same, and methods of manufacturing the cathodes for lithium air batteries.

2. Description of the Related Art

Lithium air batteries can include an anode which is capable of intercalating and deintercalating lithium, a cathode which oxidizes and reduces oxygen form the air, and a lithium ion conductive medium between the cathodes and the anodes.

In the lithium air battery, lithium is used as an anode, and air is used as a cathode active material, and thus the cathode active material does not need to be stored in the battery. Because the cathode active material does not need to be stored in the battery, a lithium air battery with a high capacity may be obtained. Lithium air batteries have a very high theoretical energy density per unit weight, e.g., 3,500 watt-hours per kilogram (Wh/kg) or greater, which is approximately 10 times greater than that of lithium ion batteries.

A lithium air battery uses, as an electrolyte, a liquid electrolyte or a solid electrolyte.

In this regard, the solid electrolyte has a lower ionic conductivity than the liquid electrolyte, and has poorer wettability at an interface thereof with a carbonaceous conductive material or the like. In addition, the solid electrolyte is squeezed out by lithium oxide formed in an air electrode during battery discharging and charging. It is difficult for the squeezed-out solid electrolyte to return and accordingly, reversible charging and discharging processes may be difficult. Moreover, when a lithium air battery operates at a high temperature, e.g., 60° C. or higher, there are problems with thermal stability and reversible charge/discharge characteristics.

Therefore, there is a need to develop a method of enhancing thermal stability and charge/discharge characteristics at high temperatures of a lithium air battery including a solid electrolyte.

SUMMARY

Provided is a cathode for a lithium air battery that provides enhanced thermal stability and charge/discharge characteristics at high temperatures.

Provided is a lithium air battery including the cathode.

Provided are methods of manufacturing the cathode.

Additional aspects will be set forth in part in the description which follows and, in part, will be apparent from the description, or may be learned by practice of the presented embodiments.

According to an aspect of an embodiment, a cathode for a lithium air battery includes a carbonaceous material including: a carbonaceous core; and a coating layer on the carbonaceous core, wherein the coating layer includes an amorphous polysilsesquioxane ionic liquid having a viscosity of at least 0.2 milliPascal-seconds as measured as a 10 weight percent solution in acetone at 30° C. at 30° C.

According to an aspect of another embodiment, a lithium air battery includes the cathode; an anode capable of intercalating and deintercalating lithium; and an electrolyte disposed between the cathode and the anode.

According to an aspect of another embodiment, a method of manufacturing a cathode for a lithium air battery includes: obtaining a mixture of a polysilsesquioxane precursor and a first solvent; drying the mixture of the polysilsesquioxane precursor and the first solvent to obtain an amorphous polysilsesquioxane ionic liquid; adding a carbonaceous core and a second solvent to the amorphous polysilsesquioxane ionic liquid to provide a solution; drying the solution to manufacture a carbonaceous material including a carbonaceous core, and a coating layer on the carbonaceous core, wherein the coating layer includes an amorphous polysilsesquioxane ionic liquid having a viscosity of at least 0.2 milliPascal-seconds as measured as a 10 weight percent solution in acetone at 30° C.; and disposing the carbonaceous material and a binder on a substrate to manufacture the cathode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
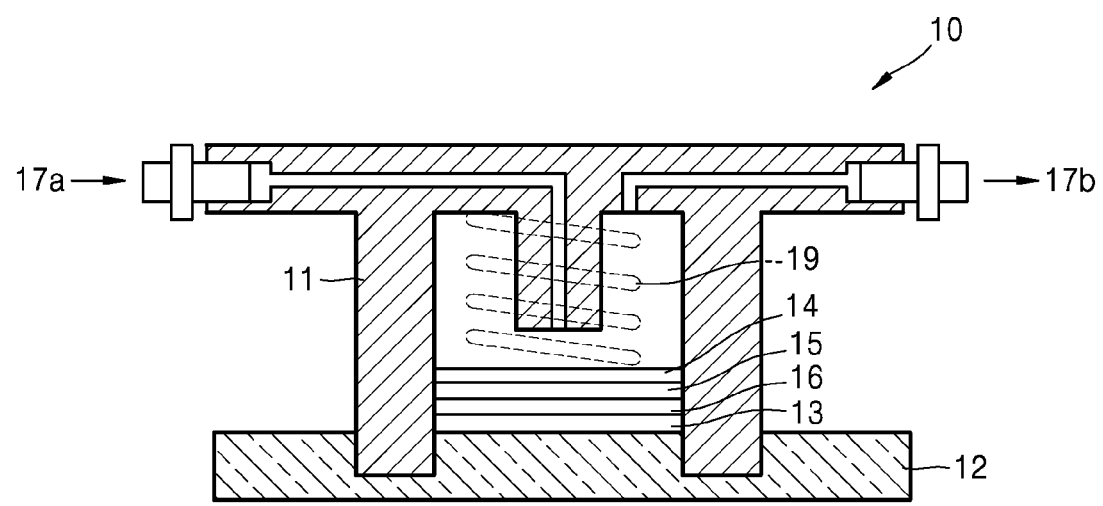
FIG. 1 is a schematic view illustrating a structure of a lithium air battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, and do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that unless otherwise stated herein, the terms "comprises" and/or "comprising", or "includes" and/or "including" do not preclude other elements, but further include other elements.

It will be understood that when an element is referred to as being "on" another element, it can be directly on the other element or intervening elements may also be present. In contrast, when an element is referred to as being "directly on" another element, there are no intervening elements present.

The term "combination thereof" as used herein refers to mixtures or combinations of at least one of the associated listed elements.

The term "amorphous" as used herein includes both "amorphous" and "amorphous-like".

Hereinafter, a cathode for a lithium air battery, a lithium air battery including the cathode, and methods of manufacturing the cathode will be disclosed in further detail. These embodiments are for illustrative purposes only and are not intended to limit the scope of disclosed embodiments.

A cathode for a lithium air battery according to an embodiment includes a carbonaceous material including: a carbonaceous core; and a coating layer on the carbonaceous core, wherein the coating layer comprises an amorphous polysilsesquioxane ionic liquid having a viscosity (n) of at least 0.2 milliPascal-seconds (mPa.$), when measured in an aprotic solvent at 30° C., for example wherein the amorphous polysilsesquioxane ionic liquid has a viscosity of at least 0.2 milliPascal-seconds as measured as a 10 weight percent solution in acetone at 30° C. For example, the amorphous polysilsesquioxane ionic liquid may have a viscosity (n) of about 0.1 mPa·s to about 2000 mPa·s, about 0.2 mPa·s to about 1200 mPa·s, or about 1.0 mPa·s to about 600 mPa·s, in an aprotic solvent at 30° C., or as measured as a 10 weight percent solution in acetone at 30° C.

Non-limiting examples of the aprotic solvent include acetone, ethanol, isopropyl alcohol, ethylene glycol, propylene glycol, N-methyl-2-pyrrolidinone (NMP), and glyme. Acetone as the aprotic solvent is specifically mentioned.

The viscosity (n) of the amorphous polysilsesquioxane ionic liquid may be measured using a LVDV-II+Pro Cone/Plate viscometer equipped with a CPE-40 cone spindle, manufactured by Brookfield Engineering Laboratories, USA. The LVDV-II+Pro Cone/Plate viscometer is calibrated with certified viscosity standards 5 cP and B29 at 25±0.2° C. according to the operating instructions and the viscosity of a sample may be measured at 30±0.2° C.

The polysilsesquioxane ionic liquid may be amorphous. The polysilsesquioxane ionic liquid may have the viscosity (n) range described above at 30° C. in an aprotic solvent. While not wanting to be bound by theory, it is understood that the amorphous polysilsesquioxane ionic liquid has a sufficiently stable O—Si—O—Si bond in the form of an oligomer and/or a polymer and thus may form a coating layer having improved structural stability on the carbonaceous core. In addition, a lithium air battery including the amorphous polysilsesquioxane ionic liquid may have enhanced thermal stability and charge/discharge characteristics at high temperatures.

The amorphous polysilsesquioxane ionic liquid may be a ladder-type amorphous polysilsesquioxane ionic liquid. The ladder-type amorphous polysilsesquioxane ionic liquid is understood to provide stable O—Si—O—Si bonds formed as a long double chain structure with O—Si—O crosslinks between the chains, and thus has improved structural stability. In addition, the ladder-type amorphous polysilsesquioxane ionic liquid has improved solubility with respect to an organic solvent and thus has improved processability and accordingly, may easily form a satisfactory coating layer. In addition, a lithium air battery including the amorphous polysilsesquioxane ionic liquid may have enhanced thermal stability and improved high temperature charge/discharge characteristics.

The amorphous polysilsesquioxane ionic liquid may be represented by Formula 1.

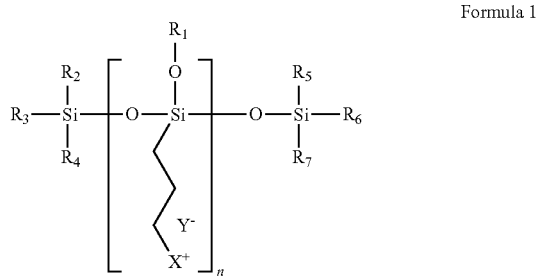

Formula 1 wherein n may be an integer from 1 to 20;
each of $R_1$ to $R_7$ may be independently hydrogen, a hydroxyl group, a substituted or unsubstituted organic functional group, a substituted or unsubstituted silicon functional group, or a combination thereof;
$X^+$ may be a quaternary nitrogen-containing cation functional group;

$Y^-$ may be $(CF_3SO_2)_2N^-$, $(C_2F_5SO_2)_2N^-$, $CF_3SO_3^-$, an anion represented by Formula 1-1, or a combination thereof.

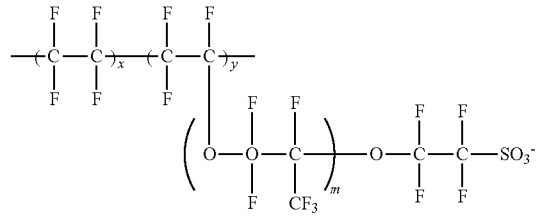

Formula 1-1 wherein x may be an integer from 0 to 15;
y may be an integer from 0 to 1000; and
m may be an integer of 1 or more.

The amorphous polysilsesquioxane ionic liquid of Formula 1 has the number n of —O—Si—O—Si— repeating units within the range described above, and while not wanting to be bound by theory, it is understood that these repeating units facilitate the formation of a stable coating layer having an appropriate viscosity on the carbonaceous core and may effectively control a side reaction with an electrolyte.

In Formula 1, $X^+$ may be a quaternary nitrogen-containing cation functional group. The quaternary nitrogen-containing cation functional group ($X^+$) may include an aliphatic quaternary nitrogen-containing cation functional group, an aromatic quaternary nitrogen-containing cation functional group, or a cyclic quaternary nitrogen-containing cation functional group, but is not limited thereto. The quaternary nitrogen-containing cation functional group ($X^+$) is chemically stable in a reaction with an electrolyte.

In Formula 1, $Y^-$ may be $(CF_3SO_2)_2N^-$, $(C_2F_5SO_2)_2N^-$, $CF_3SO_3^-$, the anion of Formula 1-1, or a combination thereof. The anion functional group imparts an appropriate viscosity to the coating layer and may act as a plasticizer that facilitates processing of the coating layer.

In the Formula 1, the quaternary nitrogen-containing cation functional group may include a quaternary nitrogen-containing cation of Formulas 2A to 2F, or a combination thereof:

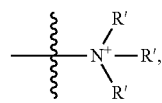

Formula 2A

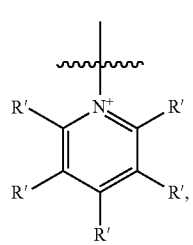

Formula 2B

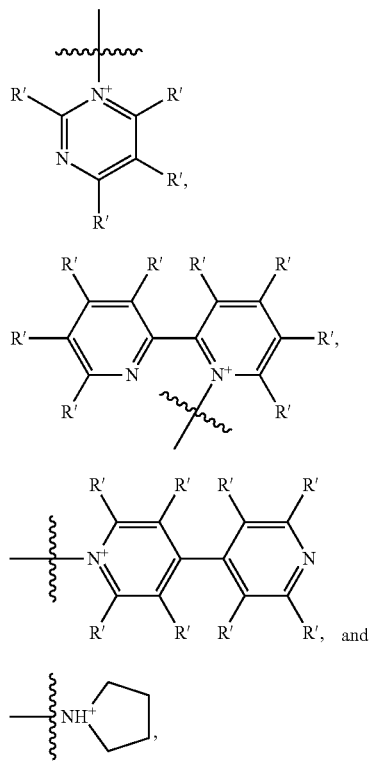

Formula 2C

Formula 2D

Formula 2E

Formula 2F wherein each R' may independently be a hydrogen atom, a hydroxyl group, a substituted or unsubstituted $C_1$-$C_{20}$ alkyl group, a substituted or unsubstituted $C_6$-$C_{20}$ aryl group, a substituted or unsubstituted $C_2$-$C_{20}$ alkenyl group, a substituted or unsubstituted $C_3$-$C_{10}$ cycloalkyl group, a substituted or unsubstituted $C_1$-$C_{20}$ alkyleneoxide group, a substituted or unsubstituted acrylate group, or a substituted or unsubstituted methacrylate group.

While not wanting to be bound by theory, it is understood that the quaternary nitrogen-containing cation functional group of Formulas 2A to 2F may facilitate hydrolysis-condensation and is more chemically stable in a reaction with an electrolyte. Thus, a lithium air battery including the quaternary nitrogen-containing cation functional group may have enhanced thermal stability and charge/discharge characteristics at high temperatures.

In Formula 1, each of $R_1$ to $R_7$ may be independently a hydroxyl group, a substituted or unsubstituted $C_1$-$C_{20}$ alkyl group, a substituted or unsubstituted $C_2$-$C_{20}$ alkenyl group, a substituted or unsubstituted $C_3$-$C_{20}$ cycloalkyl group, a substituted or unsubstituted $C_6$-$C_{20}$ aryl group, a substituted or unsubstituted $C_1$-$C_{20}$ alkyleneoxide group, a substituted or unsubstituted acrylate group, a substituted or unsubstituted methacrylate group, or a combination thereof. While not wanting to be bound by theory, it is understood that the functional groups $R_1$ to $R_7$ enable formation of a coating layer having an appropriate viscosity, even at high temperatures, and accordingly, a lithium air battery including the quaternary nitrogen-containing cation functional group of Formula 2 may have enhanced thermal stability and improved high temperature charge/discharge characteristics.

The amorphous polysilsesquioxane ionic liquid may be represented by Formula:

Formula 3 wherein $n_1$ may be an integer from 1 to 20, each of $R''_1$ to $R''_7$ may independently be a hydrogen atom, a hydroxyl group, a substituted or unsubstituted $C_1$-$C_{20}$ alkyl group, a substituted or unsubstituted $C_2$-$C_{20}$ alkenyl group, a substituted or unsubstituted $C_3$-$C_{20}$ cycloalkyl group, a substituted or unsubstituted $C_6$-$C_{20}$ aryl group, a substituted or unsubstituted $C_1$-$C_{20}$ alkyleneoxide group, a substituted or unsubstituted acrylate group, or a substituted or unsubstituted methacrylate group; and $Y_1^-$ may be $(CF_3SO_2)_2N^-$, $(C_2F_5SO_2)_2N^-$, $CF_3SO_3^-$, the anion of Formula 1-1 wherein x is an integer from 0 to 15, y is an integer from 0 to 1000, and m is 1 or 2, or a combination thereof.

The amorphous polysilsesquioxane ionic liquid of Formula 3 may form a stable coating layer having a more appropriate viscosity at high temperatures. Thus, a lithium air battery including such ionic liquid may have enhanced thermal stability and improved charge/discharge characteristics.

The amorphous polysilsesquioxane ionic liquid may have a weight average molecular weight (Mw) of greater than about 1,800 Daltons to about 5,000 Daltons. For example, the weight average molecular weight Mw of the amorphous polysilsesquioxane ionic liquid may be from about 1,000 Daltons to about 5,000 Daltons, from about 1,500 Daltons to about 4,000 Daltons, or from about 2,000 Daltons to about 3,000 Daltons.

The amorphous polysilsesquioxane ionic liquid may have a gel phase at 60° C.

The term "gel phase" as used herein means a state that maintains a physical form at room temperature, does not flow in a steady state, and intentionally includes a low molecular weight material that is liquid at room temperature, such as water or an organic solvent. Low molecular weight means a weight average molecular weight of less than 5,000 Daltons (Da), e.g., about 58 Da to about 5000 Da, or about 60 Da to about 2500 Da.

The amorphous polysilsesquioxane ionic liquid having the weight average molecular weight within the range described above may be amorphous and have a gel phase or a waxy solid phase at 60° C. or higher.

Thus, when the amorphous polysilsesquioxane ionic liquid is included in the coating layer, the coating layer may effectively protect the carbonaceous core, not be decomposed in a reaction with an electrolyte, and provide sufficient stability. A lithium air battery including the coating layer may have enhanced thermal stability and improved high temperature charge/discharge characteristics.

The amount of the coating layer may be from about 1 weight percent (wt %) to about 30 wt %, based on the total weight of the cathode. For example, the amount of the coating layer may be from about 1 wt % to about 20 wt %, for example, from about 1 wt % to about 10 wt %, based on the total weight of the cathode. When the amount of the coating layer is within the ranges described above, a coating layer having an appropriate thickness may be formed.

The coating layer may be in the form of a continuous coating or an island coating. The shape of the coating layer is not limited to the above examples.

The carbonaceous material may include carbon nanotubes. The carbon nanotubes have a one-dimensional carbon structure may provide superior cyclability relative to carbon nanoparticles, such as carbon black and acetylene black.

The carbon nanotubes may include porous multi-walled carbon nanotubes (MWCNTs). Single-walled carbon nanotubes (SWCNTs) may be in the form of a bundle in which several SWCNTs are entangled with each other or bent, making it difficult to form a film-type coating layer using the SWCNTs. The MWCNTs may form a film-type coating layer more easily than the SWCNTs and have pores, which may increase a contact area with an electrolyte. In addition, while not wanting to be bound by theory, the MWCNTs may facilitate supply and diffusion of oxygen in the cathode and may provide a space to which a product generated during battery charging and discharging is attached. Thus, a lithium air battery including such carbonaceous material may have enhanced charge/discharge characteristics.

For example, the porous MWCNTs may have a Brunauer-Emmett-Teller (BET) specific surface area of about 300 meters squared per gram ($m^2/g$) or more, for example, about 400 $m^2/g$ or more, for example, about 500 $m^2/g$ or more, for example, about 600 $m^2/g$ or more, for example, about 700 $m^2/g$ or more. The porous MWCNTs may have a BET specific surface area of about 300 $m^2/g$ to about 3000 $m^2/g$, about 500 $m^2/g$ to about 2500 $m^2/g$, or about 700 $m^2/g$ to about 2000 $m^2/g$.

The cathode may further include a binder. The binder may increase the adhesive strength of a support to the carbonaceous material.

The binder may include a thermoplastic resin or a thermosetting resin. Examples of the binder include polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer. The above-listed binder materials may be used alone or in combination. However, the binder is not limited to the above examples and any suitable binder may be used.

A lithium air battery according to another embodiment may include the cathode described above, an anode capable of intercalating and deintercalating lithium, and an electrolyte disposed between the cathode and the anode.

The cathode may include the carbonaceous material described above. The cathode including the carbonaceous material described above may have enhanced thermal stability, improved coulombic efficiency, and improved charge/discharge characteristics such as improved high temperature cyclability.

The cathode may further include a solvent and a lithium salt to form a composite cathode. The solvent may include an organic solvent, ionic liquid, an oligomer, or a combination thereof, but is not limited to the above examples. For example, any suitable solvent that is liquid at room temperature (25° C.) may be used.

The organic solvent may include an ether solvent, a carbonate solvent, an ester solvent, a ketone solvent, or a combination thereof.

For example, the organic solvent may comprise propylene carbonate, ethylene carbonate, fluoroethylene carbonate, vinyl ethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethyl sulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, for example a PEGDME having a number average molecular weight (Mn) of about 500 Da), dimethylether, diethylether, dibutylether, dimethoxyethane, 2-methyltetrahydrofuran, tetrahydrofuran, or a combination thereof. However, the organic solvent is not limited to the above examples and any suitable organic solvent that is liquid at room temperature may be used.

For example, the ionic liquid may be represented by Formula a or b:

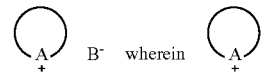

Formula a refers to a 2 to 31-membered ring containing at least one heteroatom and 2 to 30 carbon atoms and is a carbon ring, an aryl group, or a heteroaryl group, and in Formula a, A is —N($R_{a2}$)($R_{a3}$), —N($R_{a2}$), —P($R_{a2}$), or —P($R_{a2}$)($R_{a3}$), and B⁻ is an anion, wherein $R_{a2}$ and $R_{a3}$ are each independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group,

Formula b wherein in Formula b, A is —N($R_{a2}$)($R_{a3}$)($R_{a4}$), —N($R_{a2}$)$_3$, —P($R_{a2}$)$_3$, or —P($R_{a2}$)($R_{a3}$)($R_{a4}$), wherein $R_{11}$, $R_{a2}$, $R_{a3}$, and $R_{a4}$ are each independently a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group, and $B^-$ is an anion.

For example,

of Formula a may be represented by Formula c, and

of Formula b may be a cation represented by Formula d:

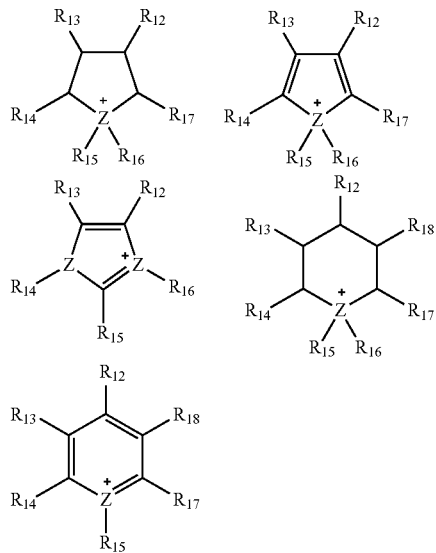

Formula c wherein in Formula c, Z is N or P, and each of $R_{12}$ to $R_{18}$ is independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group,

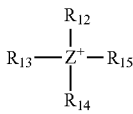

Formula d wherein in Formula d, Z is N or P, and each of $R_{12}$ to $R_{15}$ is independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group.

For example, the ionic liquid may comprise N,N-diethyl-N-methyl-N-(2-methoxyethyl)ammonium tetraborate ([DEME][BF$_4$]), diethyl methyl ammonium trifluoromethane sulfonate ([dema][TfO]), dimethyl propyl ammonium trifluoromethane sulfonate ([dmpa][TfO]), diethyl methyl ammonium trifluoromethane sulfonylimide ([dema][TFSI]), methyl propyl piperidinium trifluoromethane sulfonylimide ([mpp][TFSI]), or a combination thereof. However, the ionic liquid is not limited to the above examples and any suitable organic solvent that is liquid at room temperature may be used.

The lithium salt may comprise lithium bis-trifluoromethanesulfonimide (LiTFSI), LiPF$_6$, LiBF$_4$, LiAsF$_6$, LiClO$_4$, LiNO$_3$, lithium bis(oxalato) borate (LiBOB), LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, LiAlCl$_4$, lithium trifluoromethanesulfonate (LiTfO), or a combination thereof. However, the lithium salt is not limited to the above examples and any suitable lithium salt may be used.

The concentration of the lithium salt may be from about 0.001 molar (M) to about 4.0 M, about 0.01 M to about 2.0 M, or about 0.1 M to about 1.0 M, but is not limited to the above range. When the concentration of the lithium salt is within the range described above, enhanced battery characteristics may be obtained.

The cathode may further include a conductive material. Examples of the conductive material include metallic conductive materials such as metal fibers, metal meshes, and the like. In addition, the metal powder comprising copper, silver, nickel, aluminum, or the like may be used as the metallic conductive material. These metallic conductive materials may be porous. In addition, an organic conductive material such as a polyphenylene derivative and the like may be used. The above-listed conductive materials may be used alone or in combination.

The electrolyte may include a solid electrolyte.

The solid electrolyte may comprise an electrolyte comprising an ionically conducting polymer, a polymeric ionic liquid (PIL), an inorganic electrolyte, a polymer matrix, and an electronically conducting polymer, or a combination thereof. However, the solid electrolyte is not limited to the above examples and any suitable solid electrolyte may be used. The polymer matrix may be ionically and electrically insulating, i.e., may not have ionic conductivity or electronic conductivity.

For example, the solid electrolyte may comprise a polyethylene oxide (PEO), a solid graft copolymer such as a solid graft copolymer comprising containing at least two polymer blocks and having a low glass transition temperature (Tg), poly(diallyldimethylammonium)trifluoromethanesulfonylimide (TFSI), lithium trifluoromethanesulfonate (LiTfO), Cu$_3$N, Li$_3$N, LiPON, Li$_3$PO$_4$.Li$_2$S.SiS$_2$, Li$_2$S. GeS$_2$. Ga$_2$S$_3$. Li$_2$O.11Al$_2$O$_3$, Na$_2$O.11Al$_2$O$_3$, (Na, Li)$_{1+x}$Ti$_{2-x}$Al$_x$(PO$_4$)$_3$ where $0.1 \leq x \leq 0.9$, Li$_{1+x}$Hf$_{2-x}$Al$_x$(PO$_4$)$_3$ where $0.1 \leq x \leq 0.9$, Na$_3$Zr$_2$Si$_2$PO$_{12}$, Li$_3$Zr$_2$Si$_2$PO$_{12}$, Na$_5$ZrP$_3$O$_{12}$, Na$_5$TiP$_3$O$_{12}$, Na$_3$Fe$_2$P$_3$O$_{12}$, Na$_4$NbP$_3$O$_{12}$, a sodium silicate, Li$_{0.3}$La$_{0.5}$TiO$_3$, Na$_5$MSi$_4$O$_{12}$ wherein M is a rare earth element such as neodymium (Nd), gadolinium (Gd), dysprosium (Dy), or the like, Li$_5$ZrP$_3$O$_{12}$, Li$_5$TiP$_3$O$_{12}$, Li$_3$Fe$_2$P$_3$O$_{12}$, Li$_4$NbP$_3$O$_{12}$, Li$_{1+x}$(M, Al, Ga)$_x$(Ge$_{1-y}$Ti$_y$)$_{2-x}$(PO$_4$)$_3$ where $x \leq 0.8$, $0 \leq y \leq 1.0$, and M is Nd, samarium (Sm), europium (Eu), Gd, terbium (Tb), Dy, holmium (Ho), erbium (Er), thulium (Tm), or ytterbium (Yb), Li$_{1+x+y}$Q$_x$ $Ti_{2-x}Si_yP_{3-y}O_{12}$ where $0 \leq x \leq 0.4$, $0 \leq y \leq 0.6$, and Q is aluminum (Al) or gallium (Ga), $Li_6BaLa_2Ta_2O_{12}$, $Li_7La_3Zr_2O_{12}$, $Li_5La_3Nb_2O_{12}$, $Li_5La_3M_2O_{12}$ where M is niobium (Nb) or tantalum (Ta), $Li_{7+x}A_xLa_{3-x}Zr_2O_{12}$ where $0<x<3$ and A is zinc (Zn), or a combination thereof.

For example, the solid electrolyte may include, as an ion conductive polymer, an ion conductive repeating unit which may comprise an ether monomer, an acrylate monomer, an acrylic monomer, a methacrylate monomer, a methacrylic monomer, a siloxane monomer, or a combination thereof.

For example, the ion conductive polymer may comprise a polyethylene oxide, a polypropylene oxide, a poly(methyl methacrylate), a poly(ethyl methacrylate), a polydimethylsiloxane, a polyacrylic acid, a polymethacrylic acid, a polymethyl acrylate, a polyethyl acrylate, a poly(2-ethylhexyl acrylate), a poly(butyl methacrylate), a poly(2-ethylhexyl methacrylate), a poly(decyl acrylates), a poly(ethylene vinyl acetate), or a combination thereof.

For example, the ion conductive polymer may be a copolymer comprising an ion conductive repeating unit and a structural repeating unit.

For example, the ion conductive repeating unit may be derived from acrylic acid, methacrylic acid, methyl acrylate, methyl methacrylate, ethyl acrylate, ethyl methacrylate, 2-ethylhexyl acrylate, butyl methacrylate, 2-ethylhexyl methacrylate, decyl acrylate, ethylene vinyl acetate, ethylene oxide, propylene oxide, or a combination thereof. The structural repeating unit may be derived from styrene, 4-bromostyrene, tert-butyl styrene, divinyl benzene, methyl methacrylate, isobutyl methacrylate, butadiene, ethylene, propylene, dimethylsiloxane, isobutylene, N-isopropyl acrylamide, vinylidene fluoride, acrylonitrile, 4-methyl pentene-1, butylene terephthalate, ethylene terephthalate, vinylpyridine, or a combination thereof.

For example, the ion conductive polymer may be a block copolymer including an ion conductive phase and a structural phase. The block copolymer including an ion conductive phase and a structural phase may include, for example, block copolymers as disclosed in U.S. Pat. Nos. 8,269,197 and 8,563,168 and U.S. Patent Publication No. 2011/0206994, the contents of which are incorporated herein by reference in their entirety.

The reaction mechanism of the lithium air battery may be represented by Chemical Equation 1:

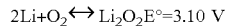    Chemical Equation 1

During battery discharging, lithium derived from the anode reacts with oxygen introduced from the cathode to generate a lithium oxide, and oxygen is reduced (oxygen reduction reaction (ORR)). In contrary, during battery charging, the lithium oxide is reduced, and oxygen is generated by oxidation (oxygen evolution reaction (OER)). Also, during the discharging, $Li_2O_2$ is deposited in pores of the cathode, and the capacity of the lithium air battery increases as the area of the electrolyte contacting oxygen in the cathode increases.

The lithium air battery may be manufactured using the following method.

First, an air electrode is prepared as a cathode. For example, the air electrode may be fabricated as follows. An electrode member may be manufactured by mixing the carbonaceous material described above, a solvent, and a lithium salt with or without a suitable solvent to prepare an air electrode slurry, coating the air electrode slurry on a surface of a current collector and drying the coated current collector and, optionally, performing compression molding on the current collector to enhance electrode density. The current collector may be a gas diffusion layer. In another embodiment, the electrode member may be manufactured by coating the air electrode slurry on a surface of a separator or a solid electrolyte membrane and drying the coated member, and optionally compression molding the separator or the solid electrolyte membrane to enhance electrode density.

The carbonaceous material, the solvent, and the lithium salt used in the air electrode slurry have already been described above and thus further detailed description thereof will not be repeated for clarity.

The air electrode slurry may optionally include a binder in addition to the binder described above.

To rapidly diffuse oxygen, the current collector may be a porous structure in a net or mesh form or a porous metal plate formed of stainless steel, nickel, aluminum, or the like. However, the current collector is not limited to the above examples, and any suitable current collector may be used. The current collector may be coated with an oxidation resistant metal or alloy in order to prevent oxidation of the current collector.

The air electrode slurry may selectively include a catalyst for oxidation/reduction of oxygen and a conductive material. In addition, the air electrode slurry may optionally include lithium oxide.

A catalyst for oxidation/reduction of oxygen may be added to the cathode. Examples of the catalyst include a precious metal catalyst such as platinum, gold, silver, palladium, ruthenium, rhodium, osmium, or a combination thereof; an oxide catalyst such as manganese oxide, iron oxide, cobalt oxide, nickel oxide, or a combination thereof; or an organic metal catalyst such as cobalt phthalocyanine. A combination comprising at least one of the foregoing may be used. However, the catalyst is not particularly limited to the above examples and any suitable catalyst for oxidation/reduction of oxygen may be used.

In addition, the catalyst may be supported on a catalyst support. The catalyst support may comprise an oxide, a zeolite, a clay-based mineral, carbon, or the like. The oxide may comprise alumina, silica, zirconium oxide, titanium dioxide, or a combination thereof. The oxide may comprise an oxide comprising metal, and the metal may comprise cerium (Ce), praseodymium (Pr), samarium (Sm), Eu, Tb, Tm, Yb, antimony (Sb), bismuth (Bi), vanadium (V), chromium (Cr), manganese (Mn), iron (Fe), cobalt (Co), nickel (Ni), copper (Cu), Nb, molybdenum (Mo), tungsten (W), or a combination thereof. Examples of the carbon include a carbon black such as Ketjen black, acetylene black, channel black, lamp black, or a combination thereof; a graphite such as natural graphite, artificial graphite, expandable graphite, or a combination thereof; an activated carbon; or carbon fiber. A combination comprising at least one of the foregoing may be used. However, the carbon is not limited to the above examples and any suitable catalyst support may be used.

Next, an anode is prepared.

The anode may be, for example, a lithium metal thin film. A lithium metal alloy may be, for example, an alloy of lithium with aluminum, tin, magnesium, indium, calcium, titanium, vanadium, or a combination thereof.

In addition, a separator may be disposed between the cathode and the anode. The separator is not particularly limited as long as it has a composition that can withstand service conditions of the lithium air battery. Examples of the separator include a polymer nonwoven fabric such as a polypropylene nonwoven fabric or a polyphenylene sulfide nonwoven fabric; a porous film comprising an olefin resin such as polyethylene or polypropylene. A combination comprising at least one of these materials may be used.

An oxygen-blocking film that is impervious to oxygen may be disposed between the cathode and the anode. The oxygen-blocking film may be a lithium ion conductive solid electrolyte membrane and serve as a protective film that prevents impurities such as oxygen and the like included in the electrolyte at the cathode from directly reacting with a Li metal anode. A material for forming the lithium ion conductive solid electrolyte membrane impervious to oxygen may be a lithium ion conductive glass, a lithium ion conductive crystal (e.g., a ceramic or glass-ceramic), or an inorganic material containing a mixture thereof. However, the material is not particularly limited to the above examples and any suitable solid electrolyte membrane that has lithium ion conductivity, is impervious to oxygen, and protects an anode may be used. Taking chemical stability of the lithium ion conductive solid electrolyte membrane into consideration, the lithium ion conductive solid electrolyte membrane may include an oxide.

The lithium ion conductive solid electrolyte membrane has a high ionic conductivity when including a large amount of lithium ion conductive crystals and thus the amount of the lithium ion conductive crystals may be, for example, about 50 weight percent (wt %) or more, for example, about 55 wt % or more, or about 60 wt % or more, with respect to the total weight of the lithium ion conductive solid electrolyte membrane. The amount of the lithium ion conductive crystals may be about 50 wt % to about 95 wt %, about 60 wt % to about 90 wt %, or about 70 wt % to about 90 wt %, with respect to the total weight of the lithium ion conductive solid electrolyte membrane.

Examples of the lithium ion conductive crystals include perovskite crystals with lithium ion conductivity, such as $Li_3N$, LISICONs, and $La_{0.55}Li_{0.35}TiO_3$, $LiTi_2P_3O_{12}$ crystals having a NASICON structure, and glass-ceramic that deposits these crystals.

For example, the lithium ion conductive crystal may be $Li_{1+x+y}(Al, Ga)_x(Ti, Ge)_{2-x}Si_yP_{3-y}O_{12}$ where $0 \leq x \leq 1$ and $0 \leq y \leq 1$, for example, $0 \leq x \leq 0.4$ and $0 < y \leq 0.6$, or $0.1 \leq x \leq 0.3$ and $0.1 < y \leq 0.4$. To have a high ionic conductivity, the lithium ion conductive crystal desirably does not have grain boundaries that inhibit ionic conductivity. For example, a glass-ceramic may contain few pores or grain boundaries that inhibit ionic conductivity and thus may have high ionic conductivity and chemical stability.

Non-limiting examples of the lithium ion conductive glass-ceramic include lithium-aluminum-germanium-phosphate (LAGP), lithium-aluminum-titanium-phosphate (LATP), and lithium-aluminum-titanium-silicon-phosphate (LATSP).

For example, when a parent glass having a composition of $Li_2O-Al_2O_3-TiO_2-SiO_2-P_2O_5$ is crystallized by heat treatment, a primary crystal phase of the parent glass comprise, e.g., consist of, $Li_{1+x+y}Al_xTi_{2-x}Si_yP_{3-y}O_{12}$ where $0 \leq x \leq 1$ and $0 \leq y \leq 1$. In this regard, x and y may satisfy the conditions: $0 \leq x \leq 0.4$ and $0 \leq y \leq 0.6$, or $0.1 \leq x \leq 0.3$ and $0.1 \leq y \leq 0.4$.

The term "pores or grain boundaries that inhibit ionic conductivity" used herein refers to ionic conductivity-inhibiting materials, such as pores or grain boundaries that reduce the lithium ion conductivity of an inorganic material including lithium ion conductive crystals to a tenth or less that of the lithium ion conductive crystals in the inorganic material.

For example, the oxygen blocking film may comprise $Li_{1+x+y}Al_xTi_{2-x}Si_yP_{3-y}O_{12}$ where $0 \leq x \leq 1$ and $0 \leq y \leq 1$. In this regard, x and y satisfy, for example, the conditions: $0 \leq x \leq 0.4$ and $0 < y \leq 0.6$, or $0.1 \leq x \leq 0.3$ and $0.1 < y \leq 0.4$.

For example, the oxygen blocking film may comprise $Li_{1+x+y}Al_x(Ti, Ge)_{2-x}Si_yP_{3-y}O_1$ where $0 \leq x \leq 2$ and $0 \leq y \leq 3$ and may comprise, for example, a solid electrolyte membrane including $Li_{1.4}Ti_{1.6}Al_{0.4}P_3O_{12}$ (LATP).

The lithium air battery may further include an anode interlayer between the anode and the oxygen-blocking film. The anode interlayer may be employed to prevent a side reaction generated between the anode and the oxygen-blocking film.

The anode interlayer may include a solid polymer electrolyte. For example, the solid polymer electrolyte may comprise a lithium salt-doped polyethylene oxide (PEO) and non-limiting examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The lithium air battery may be a lithium primary battery or a lithium secondary battery. In addition, the lithium air battery may have, for example, a coin shape, a button shape, a sheet shape, a stack shape, a cylinder shape, a panel shape, a corn shape, or the like, but the shape is not limited thereto. Also, the lithium air battery may be used as a large-size battery for electric vehicles and the like.

FIG. 1 is a view of a lithium air battery 10 according to an embodiment. Referring to FIG. 1, the lithium air battery 10 includes a cathode 15 adjacent to a cathode current collector (not shown) and using oxygen as an active material, an anode 13 adjacent to an anode current collector 12 and including lithium, and a solid electrolyte membrane 16 adjacent to the anode 13. An anode interlayer (not shown) may be further disposed between the anode 13 and the solid electrolyte membrane 16. The cathode current collector (not shown) has porosity and may also serve as a gas diffusion layer which enables diffusion of air. Porous carbon paper 14 may be further disposed between the cathode current collector (not shown) and the cathode 15. A pressing member 19 is disposed on the cathode current collector (not shown) so that air is transferred to an air electrode. A case 11 formed of an insulating resin material is disposed between the cathode 14 and the anode 13 so as to electrically separate the cathode 14 from the anode 13. Air is supplied from an air inlet 17a and discharged to an air outlet 17b. The lithium air battery may be accommodated in a stainless steel reactor.

The term "air" used herein is not limited to atmospheric air, and refers to either a gas combination including oxygen or a pure oxygen gas. The broad definition of the term "air" may be applied to all kinds of applications including an air battery, an air cathode, and the like.

The lithium air battery has improved thermal stability and improved high temperature charge/discharge characteristics and may be used in electric vehicles (EVs). In addition, the lithium air battery may be used in hybrid vehicles such as plug-in hybrid electric vehicles (PHEVs) and the like.

In addition, the term "substituted" as used herein means substitution with a halogen atom, a $C_1$-$C_{20}$ alkyl group substituted with a halogen atom (e.g., —$CCF_3$, —$CHCF_2$, —$CH_2F$, —$CCl_3$, or the like), a hydroxyl group, a nitro group, a cyano group, an amino group, an amidino group, a hydrazine, a hydrazone, a carboxyl group or a salt thereof, a sulfonic acid or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl). alkenyl "Cycloalkyl" means a monovalent group having one or more saturated rings in which all ring members are carbon (e.g., cyclopentyl and cyclohexyl).

"Alkylene oxide" means an aliphatic C2 to C100 epoxide, for example ethylene oxide, propylene oxide or butylene oxide. "Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

The prefix "hetero" means that the compound or group includes at least one a heteroatom (e.g., 1, 2, or 3 heteroatom(s)), wherein the heteroatom(s) is each independently N, O, S, Si, or P.

A method of manufacturing the cathode for a lithium air battery, according to another embodiment, may include: obtaining a mixture of a polysilsesquioxane precursor and a first solvent; drying the mixture of the polysilsesquioxane precursor and the first solvent to obtain an amorphous polysilsesquioxane ionic liquid; adding a carbonaceous core and a second solvent to the amorphous polysilsesquioxane ionic liquid to provide a solution; drying the solution to manufacture a carbonaceous material comprising a carbonaceous core, and a coating layer on the carbonaceous core, wherein the coating layer comprises an amorphous polysilsesquioxane ionic liquid having a viscosity of at least 0.2 milliPascal-seconds as measured in an aprotic solvent, for example as a 10 weight percent solution in acetone, at 30° C.; and disposing the carbonaceous material and a binder on a substrate to manufacture the cathode.

The obtaining of the amorphous polysilsesquioxane ionic liquid may include obtaining amorphous polysilsesquioxane ionic liquid by hydrolysis-condensation of the polysilsesquioxane precursor in the first solvent.

In the obtaining of the amorphous polysilsesquioxane ionic liquid, amorphous polysilsesquioxane ionic liquid may be obtained by two reactions: hydrolysis and condensation. In the hydrolysis process, a polysilsesquioxane precursor as a starting material is hydrolyzed to form a silanol as a reaction intermediate and the silanol, which has a strong hydrogen bond, is self-assembled to a ladder-type structure to form an aggregate, and the condensation reaction is performed by introducing an anion.

The polysilsesquioxane precursor may include 3-(trimethoxysilyl)propyl-N,N,N-trimethylammonium chloride, and at least one compound selected from N,N-bis(trifluoromethanesulfonyl)imide, N,N-bis(trifluoroethanesulfonyl)imide, and a compound represented by Formula 1-2:

Formula 1-2

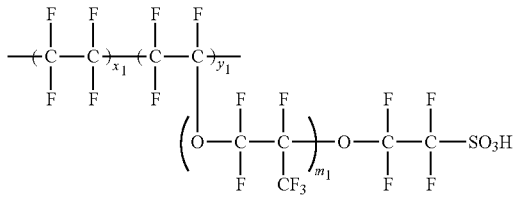

wherein $x_1$ may be an integer from 3 to 5; $y_1$ may be an integer from 100 to 1000; and $m_1$ may be an integer of 1 or more.

As the polysilsesquioxane precursor, 3-(trimethoxysilyl)propyl-N,N,N-trimethylammonium chloride may be hydrolyzed more easily than a (trialkoxysilyl)propyl compound having other carbon numbers. In addition, N,N-bis(trifluoromethanesulfonyl)imide, N, N-bis(trifluoroethanesulfonyl)imide, or the compound of Formula 1-2 may serve as an appropriate plasticizer in the formation of a coating layer.

Thus, the amorphous polysilsesquioxane ionic liquid obtained from the polysilsesquioxane precursor may enable formation of a coating layer that is amorphous and has a high viscosity. A lithium air battery including such coating layer may have enhanced thermal stability and improved high temperature charge/discharge characteristics.

The mixture of a polysilsesquioxane precursor and a first solvent may have a gel phase at 60° C.

The first solvent may include a mixed solvent of methanol and water. A volume ratio of the mixed solvent may be from about 2:1 to about 6:1. For example, the volume ratio of the mixed solvent may be from about 3:1 to about 5:1, for example, from about 3.9:1 to about 4.1:1. The mixed solvent having the volume ratio within the ranges described above is understood to participate in the condensation reaction and consequently, ladder-type amorphous polysilsesquioxane ionic liquid having a high viscosity may be obtained.

Next, a carbonaceous core and a second solvent are added to the amorphous polysilsesquioxane ionic liquid to provide a solution, and the resulting solution is dried, thereby completing the preparation of the carbonaceous material described above. The carbonaceous core has already been described and thus further description thereof will not be repeated for clarity. The second solvent may be the organic solvent described above, ionic liquid, or the like and a detailed description thereof will be omitted herein.

The cathode material described above is added to the carbonaceous material, thereby completing the manufacture of the cathode for a lithium air battery.

An embodiment will now be disclosed in further detail with reference to the following examples and comparative examples. These examples are for illustrative purposes only and are not intended to limit the scope of the disclosed embodiment.

EXAMPLES

Preparation of Amorphous Polysilsesquioxane Ionic Liquid

Preparation Example 1: Preparation of Amorphous Polysilsesquioxane Ionic Liquid 4.2 grams (g) of N,N-bis(trifluoromethanesulfonyl)imide (TFSI, from Sigma Aldrich) as a precursor was added to a methanol solution in which 7.72 g of 3-(trimethoxysilyl)propyl-N,N,N-trimethylammonium chloride was dissolved and 30 g of deionized water and the resulting solution was stirred for two hours to prepare a mixture. The mixture was dispersed using a centrifugal separator at 5000 revolutions per minute (rpm) for 5 minutes and 30 g of deionized water was further added thereto to obtain a dispersion. This process was repeated 10 times.

The dispersion was vacuum-dispersed at 20° C. for 2 hours, 3 g of methanol was added thereto, and the resulting dispersion was mixed for 10 minutes, followed by further drying at 60° C. for 12 hours and at 150° C. for 12 hours, thereby obtaining amorphous polysilsesquioxane ionic liquid.

Preparation Example 2: Preparation of Amorphous Polysilsesquioxane Ionic Liquid

Amorphous polysilsesquioxane ionic liquid was prepared in the same manner as in Preparation Example 1, except that 5.69 g of N,N-bis(pentafluoroethanesulfonyl)imide (BETI, from Apollo Scientific Ltd) was added instead of adding 4.2 g of N,N-bis(trifluoromethanesulfonyl)imide (TFSI, from Sigma Aldrich).

Preparation Example 3: Preparation of Amorphous Polysilsesquioxane Ionic Liquid

Amorphous polysilsesquioxane ionic liquid was prepared in the same manner as in Preparation Example 1, except that 25 g (20 wt %) of Nafion perfluorosulfonic acid (DE-2021, from Dupont), prepared by dissolving a compound represented by Formula 1-2 in a lower aliphatic alcohol and water, was added instead of adding 4.2 g of N,N-bis(trifluoromethanesulfonyl)imide (TFSI, from Sigma Aldrich).

Formula 1-2

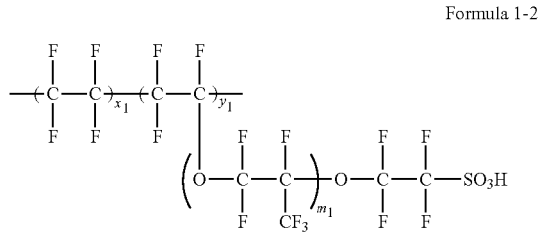

wherein $x_1$ is an integer from 3 to 5;
$y_1$ is an integer from 100 to 1000; and
$m_1$ is an integer of 1 or 2.

Preparation of Carbonaceous Material

Preparation Example 4: Preparation of Carbonaceous Material 0.09 g of multi-walled carbon nanotubes (from XinNano Materials Inc., Taiwan, D: 8 nm, L: 10 μm) and 0.01 g of the amorphous polysilsesquioxane ionic liquid prepared according to Preparation Example 1 were added to 10 g of acetone and the resulting solution was stirred for 2 hours to prepare a mixture. The mixture was filtered and then the filtrate was dried at 60° C. for 12 hours, followed by further drying in vacuum at 120° C. for 1 hour to obtain a carbonaceous material in which a coating layer formed of the amorphous polysilsesquioxane ionic liquid was formed on a core formed of the multi-walled carbon nanotubes.

Preparation Example 5: Preparation of Carbonaceous Material

A carbonaceous material was prepared in the same manner as in Preparation Example 4, except that 0.01 g of the amorphous polysilsesquioxane ionic liquid prepared according to Preparation Example 2 was added instead of 0.01 g of the amorphous polysilsesquioxane ionic liquid of Preparation Example 1.

Preparation Example 6: Preparation of Carbonaceous Material

A carbonaceous material was prepared in the same manner as in Preparation Example 4, except that 0.01 g of the amorphous polysilsesquioxane ionic liquid prepared according to Preparation Example 3 was added instead of 0.01 g of the amorphous polysilsesquioxane ionic liquid of Preparation Example 1.

Comparative Preparation Example 1: Carbonaceous Material

Multi-walled carbon nanotubes (from XinNano Materials Inc., D: 8 nm, L: 10 μm) were prepared as a carbonaceous material.

Manufacture of Cathode/Solid Electrolyte Membrane Structure for Lithium Air Battery Example 1: Manufacture of Cathode/Solid Electrolyte Membrane Structure for Lithium Air Battery 1 Milligram (mg) of the carbonaceous material prepared according to Preparation Example 4, 0.3 molar (M) lithium bis(trifluoromethane sulfonyl)imide (LiTFSI) as a lithium salt, and 2 mg of diethylmethylammonium bis(trifluoromethane sulfonyl)imide (DEMA-TFSI) were mixed in a mortar for about 5 minutes to prepare a cathode paste.

The cathode paste was spread on a solid electrolyte membrane (LICGC™ (LATP, from Ohara, thickness: 250 micrometers (μm))) and then coated thereon using a roller to manufacture a cathode/solid electrolyte membrane structure. In this regard, the cathode had a loading amount of 3.0 milligrams per square centimeter (mg/cm$^2$).

Example 2: Manufacture of Cathode/Solid Electrolyte Membrane Structure for Lithium Air Battery A cathode/solid electrolyte membrane structure was manufactured in the same manner as in Example 1, except that 0.5M LiTFSI was added as a lithium salt to prepare a cathode paste, instead of 0.3 M LiTFSI. In this regard, the cathode had a loading amount of 3.0 mg/cm$^2$.

Example 3: Manufacture of Cathode/Solid Electrolyte Membrane Structure for Lithium Air Battery A cathode/solid electrolyte membrane structure was manufactured in the same manner as in Example 1, except that 2 mg of the carbonaceous material prepared according to Preparation Example 5 was used instead of 1 mg of the carbonaceous material of Preparation Example 4. In this regard, the cathode had a loading amount of 3.0 mg/cm$^2$.

Example 4: Manufacture of Cathode/Solid Electrolyte Membrane Structure for Lithium Air Battery A cathode/solid electrolyte membrane structure was manufactured in the same manner as in Example 1, except that 2 mg of the carbonaceous material prepared according to Preparation Example 6 was used instead of 1 mg of the carbonaceous material of Preparation Example 4. In this regard, the cathode had a loading amount of 3.0 mg/cm².

Comparative Example 1: Manufacture of Cathode/Solid Electrolyte Membrane Structure for Lithium Air Battery A cathode/solid electrolyte membrane structure was manufactured in the same manner as in Example 1, except that 2 mg of the carbonaceous material prepared according to Comparative Preparation Example 1 was used instead of 1 mg of the carbonaceous material of Preparation Example 4. In this regard, the cathode had a loading amount of 3.0 mg/cm².

Comparative Example 2: Manufacture of Cathode/Solid Electrolyte Membrane Structure for Lithium Air Battery A cathode/solid electrolyte membrane structure was manufactured in the same manner as in Example 2, except that 2 mg of the carbonaceous material of Comparative Preparation Example 1 was used instead of 1 mg of the carbonaceous material of Preparation Example 4. In this regard, the cathode had a loading amount of 3.0 mg/cm².

Comparative Example 3: Manufacture of Cathode/Solid Electrolyte Membrane Structure for Lithium Air Battery 0.3 M LiTFSI as a lithium salt and 2 mg of trimethylpropylammonium were mixed in a mortar for about 5 minutes to prepare a cathode paste.

The cathode paste was spread on a solid electrolyte membrane (LICGC™ (LATP, from Ohara, thickness: 250 µm)) and then coated thereon using a roller to manufacture a cathode/solid electrolyte membrane structure. In this regard, the cathode had a loading amount of 3.0 mg/cm².

Manufacture of Lithium Air Battery

Example 5: Manufacture of Lithium Air Battery

A stainless steel wire (SUS) mesh 12 was fixed on a Teflon case, a lithium metal anode 13 having a diameter of 16 millimeters (mm) was mounted thereon, and then a PEO film (thickness: 150 µm) was used as an anode interlayer (not shown) on the lithium metal anode 13 to prevent direct contact between LATP and Li. In this regard, the PEO film was prepared according to the following processes.

Polyethylene oxide having a weight average molecular weight (Mw) of 600,000 Daltons and LiTFSI were added to 100 milliliters (mL) of acetonitrile and mixed therein for at least 12 hours. A mixing ratio of LiTFSI and polyethylene oxide was 1:18 on a molar basis.

The lithium metal anode 13 and the anode interlayer were stacked and the cathode/solid electrolyte membrane structure manufactured according to Example 1 was mounted thereon to manufacture a cell having a structure as illustrated in FIG. 1. As illustrated in FIG. 1, an LATP solid electrolyte membrane 16 (thickness: 250 µm) as an oxygen-blocking film was disposed so as to contact the anode interlayer (not shown).

Carbon paper 14 having a diameter of 15 mm (thickness: 250 µm, from SGL, 35-DA) as a gas diffusion layer was mounted on the other surface of the cathode 15 and a stainless steel wire (SUS) mesh as a current collector was stacked thereon to manufacture a lithium air battery illustrated in FIG. 1.

Finally, the lithium air battery was covered with a Teflon case and fixed by a pressing member.

Example 6: Manufacture of Lithium Air Battery

A lithium air battery was manufactured in the same manner as in Example 5, except that the cathode/solid electrolyte membrane structure manufactured according to Example 2 was used instead of the cathode/solid electrolyte membrane structure of Example 1.

Example 7: Manufacture of Lithium Air Battery

A lithium air battery was manufactured in the same manner as in Example 5, except that the cathode/solid electrolyte membrane structure manufactured according to Example 3 was used instead of the cathode/solid electrolyte membrane structure of Example 1.

Example 8: Manufacture of Lithium Air Battery

A lithium air battery was manufactured in the same manner as in Example 5, except that the cathode/solid electrolyte membrane structure manufactured according to Example 4 was used instead of the cathode/solid electrolyte membrane structure of Example 1.

Comparative Example 4: Manufacture of Lithium Air Battery

A lithium air battery was manufactured in the same manner as in Example 5, except that the cathode/solid electrolyte membrane structure manufactured according to Comparative Example 1 was used instead of the cathode/solid electrolyte membrane structure of Example 1.

Comparative Example 5: Manufacture of Lithium Air Battery

A lithium air battery was manufactured in the same manner as in Example 5, except that the cathode/solid electrolyte membrane structure manufactured according to Comparative Example 2 was used instead of the cathode/solid electrolyte membrane structure of Example 1.

Comparative Example 6: Manufacture of Lithium Air Battery

A lithium air battery was manufactured in the same manner as in Example 5, except that the cathode/solid electrolyte membrane structure manufactured according to Comparative Example 3 was used instead of the cathode/solid electrolyte membrane structure of Example 1.

Analysis of Structure and the Like of Amorphous Polysilsesquioxane Ionic Liquid

Analysis Example 1: $^1$H NMR Spectrum Analysis and $^{29}$Si NMR Spectrum Analysis 10 mg of the amorphous polysilsesquioxane ionic liquid of Preparation Example 1 was dissolved in 0.5 mL of a mixed solvent of $CDCl_2$ and acetone in a volume ratio of 1:2 and $^1$H NMR spectrum analysis and $^{29}$Si NMR spectrum analysis of the resulting solution were conducted. The analysis results are shown in FIGS. 2 and 3.

The $^1$H NMR analysis was implemented using Unity NOVA600 (from Varian, 600 MHz). The $^{29}$Si NMR spectrum analysis was implemented using AVANCEIII (from Bruker, 600 MHz).

Figure 2:
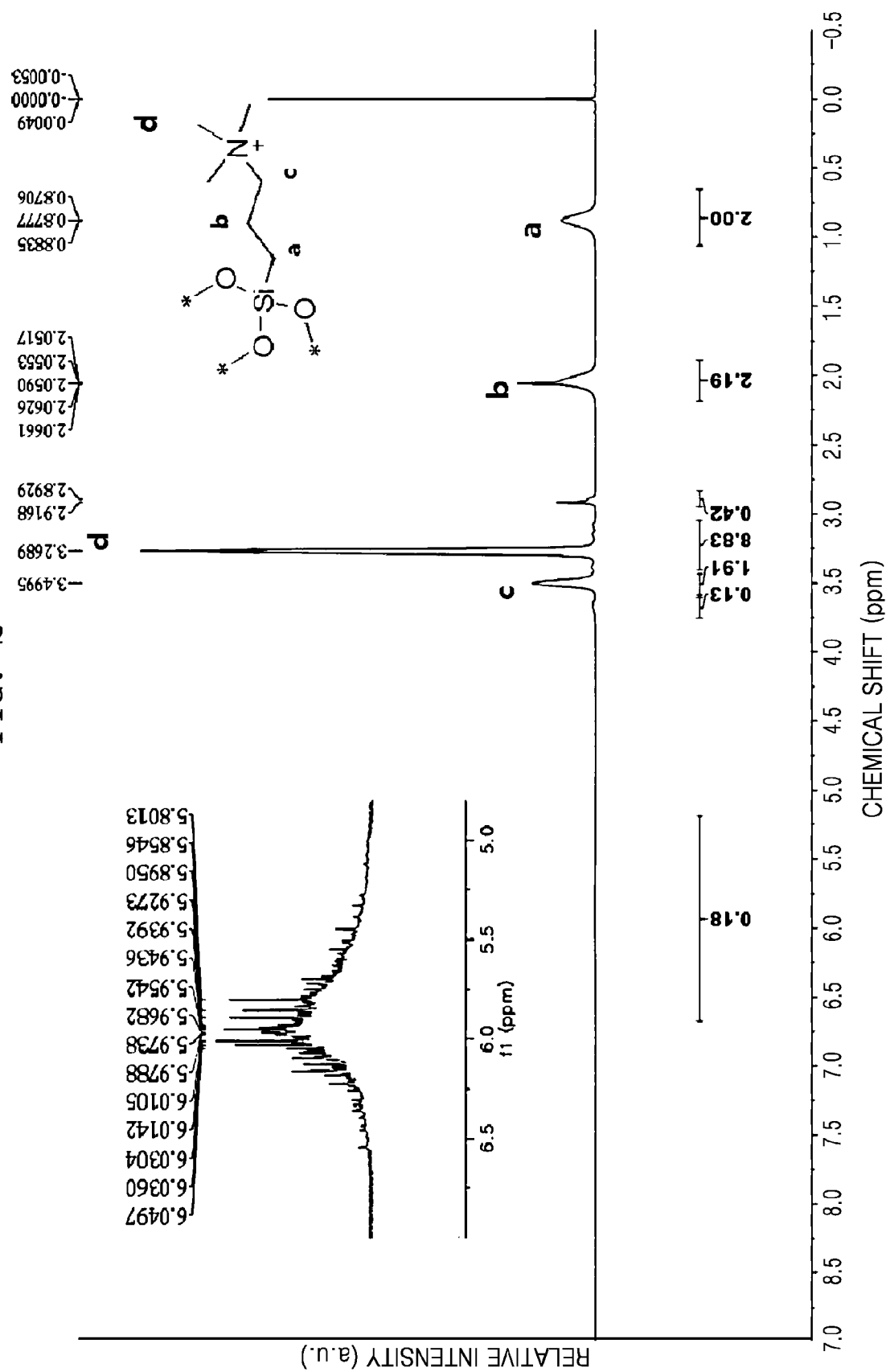
FIG. 2 is a graph of intensity (arbitrary units, a.u.) versus chemical shift (parts per million, ppm) relative to tetramethylsilane and illustrates the results of proton nuclear magnetic resonance ($^1$H NMR) of an amorphous polysilsesquioxane ionic liquid prepared according to Preparation Example 1.

Referring to FIG. 2, in the $^1$H NMR spectrum analysis, 4 peaks (a, b, c and d portions) derived from 3-(trimethylammonium)propyl of the amorphous polysilsesquioxane ionic liquid of Preparation Example 1 are observed.

Figure 3:
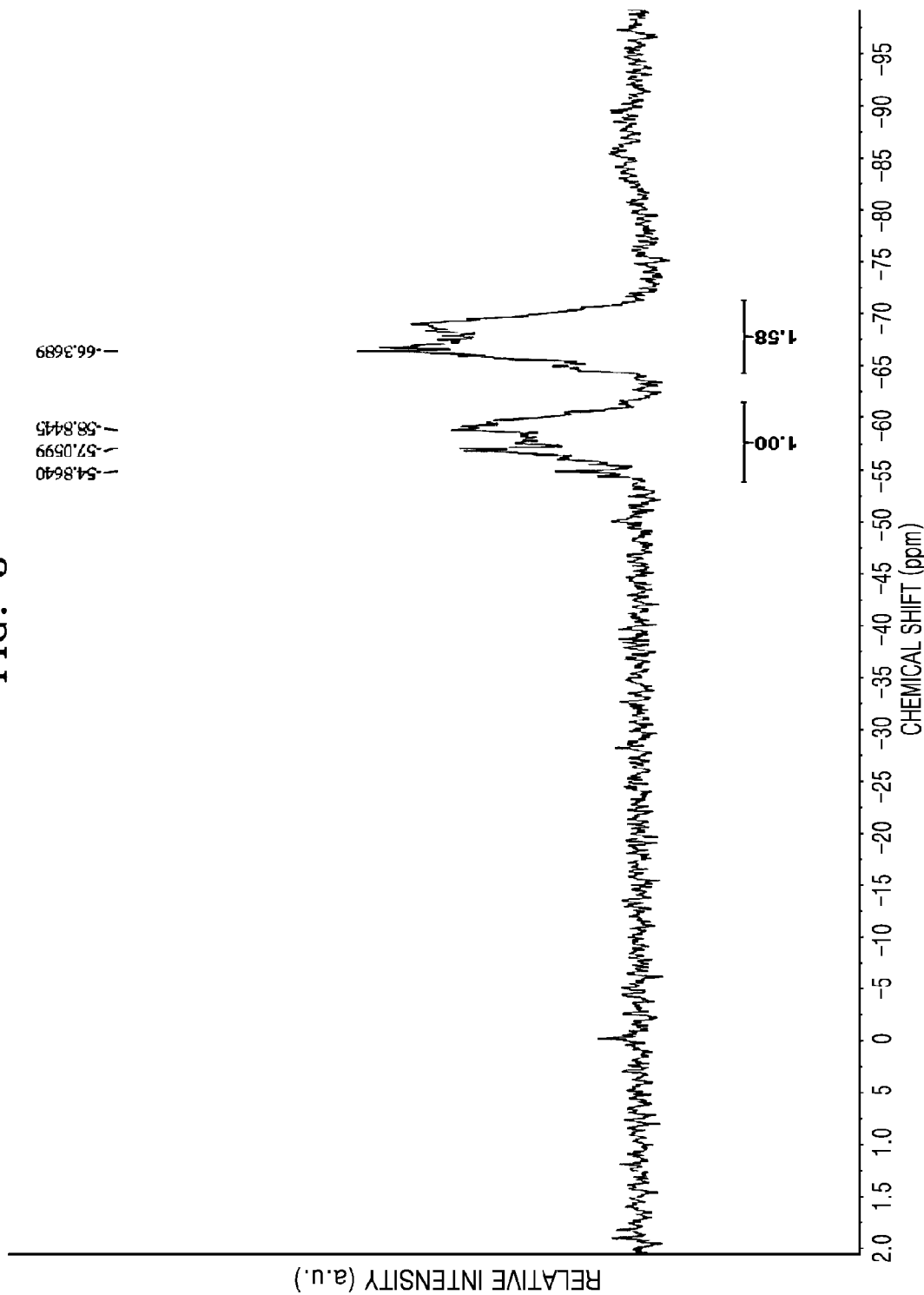
FIG. 3 is a graph of intensity (arbitrary units, a.u.) versus chemical shift (parts per million, ppm) relative to tetramethylsilane and illustrates the results of silicon nuclear magnetic resonance ($^{29}$Si NMR) analysis of the amorphous polysilsesquioxane ionic liquid of Preparation Example 1.

Referring to FIG. 3, in the $^{29}$Si NMR spectrum analysis, two wide peaks are observed at −57 and −70 ppm versus TMS. This result indicates that 3-(trimethoxysilyl)propyl-N,N,N-trimethylammonium chloride and N,N-bis(trifluoromethanesulfonyl)imide as precursors of the amorphous polysilsesquioxane ionic liquid of Preparation Example 1 form a siloxane bond as a main chain through hydrolysis and condensation.

Analysis Example 2: X-Ray Diffraction (XRD) Analysis

XRD analysis was performed on the amorphous polysilsesquioxane ionic liquid of Preparation Example 1. The analysis results are illustrated in FIG. 4.

Figure 4:
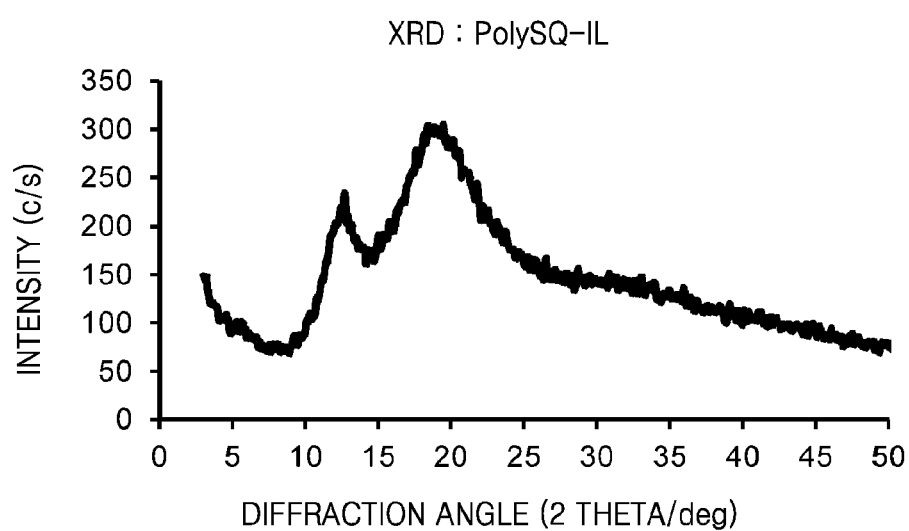
FIG. 4 is a graph intensity (counts per second, c/s) versus diffraction angle (degrees two-theta) showing the results of X-ray diffraction (XRD) analysis of the amorphous polysilsesquioxane ionic liquid of Preparation Example 1.

Referring to FIG. 4, the amorphous polysilsesquioxane ionic liquid of Preparation Example 1 has two wide and smooth peaks. From the results shown in FIG. 4, it is confirmed that the amorphous polysilsesquioxane ionic liquid of Preparation Example 1 had an amorphous-like structure.

Analysis Example 3: Matrix Assisted Laser Desorption/Ionization Time-of-Flight (MALDI-TOF) Mass Spectrometry MALDI-TOF mass spectrometry was performed on the amorphous polysilsesquioxane ionic liquid of Preparation Example 1. The analysis results are illustrated in FIG. 5.

The MALDI-TOF mass spectrometry was performed using an MALDI-TOF mass spectrometer from PerSeptive Biosystems, Framingham (337 nm nitrogen laser, accelerating voltage of 20 kV, 1.2 m flight tube, average signal: 20). For calibration, a polymer standard having a number average molecular weight Mn of 470 Daltons was used.

A sample for the MALDI-TOF mass spectrometry was prepared by dissolving 10 mg of the amorphous polysilsesquioxane ionic liquid of Preparation Example 1 in 1 mL of tetrahydrofuran and applying the resulting solution on a graphite plate. Dithranol was prepared as a matrix.

Figure 5:
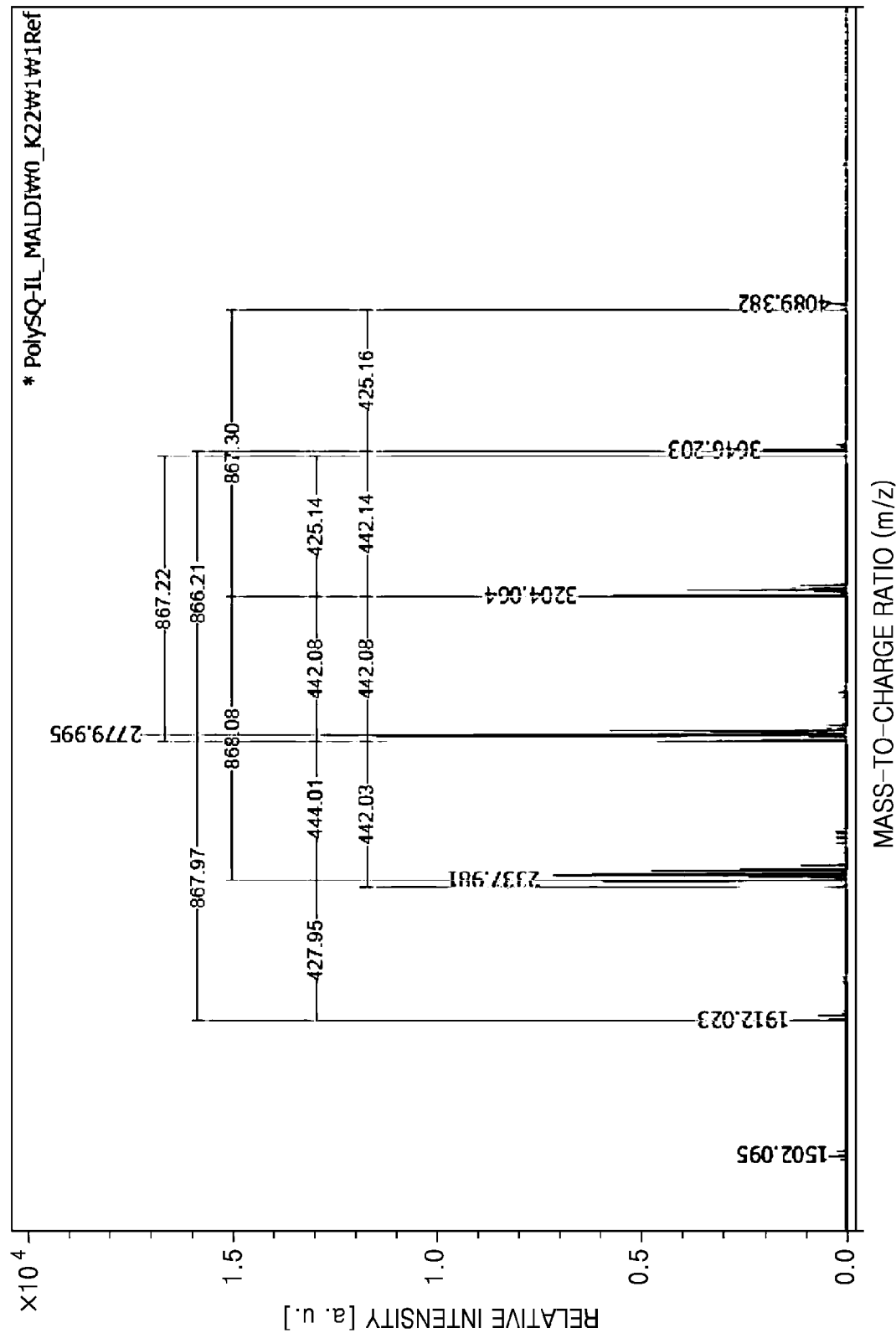
FIG. 5 is a graph of intensity (arbitrary units, a.u.) versus mass to charge ratio (M/Z) showing the results of matrix assisted laser desorption/ionization time-of-flight (MALDI-TOF) analysis of the amorphous polysilsesquioxane ionic liquid of Preparation Example 1.

Referring to FIG. 5, it is confirmed that the amorphous polysilsesquioxane ionic liquid of Preparation Example 1 had a weight average molecular weight (Mw) of about 2,780 Daltons.

Analysis Example 4: Phase Evaluation at 60° C.

The phase of the amorphous polysilsesquioxane ionic liquid of Preparation Example 1 at 60° C. was evaluated using the following method. The evaluation results are shown in FIG. 6.

To observe the phase of the amorphous polysilsesquioxane ionic liquid, the mixture prepared in Preparation Example 1 was added in an amount of about ½ the total volume of a beaker, heat-treated at 100° C. for 1 hour in an air atmosphere, and then cooled down to 60° C. at room temperature.

Figure 6:
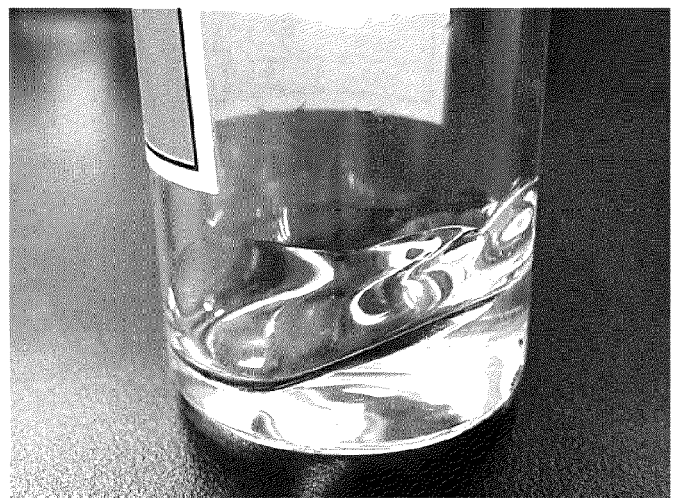
FIG. 6 is a photograph of a phase of the amorphous polysilsesquioxane ionic liquid of Preparation Example 1 at 60° C.

Referring to FIG. 6, the amorphous polysilsesquioxane ionic liquid has a gel phase at 60° C.

Evaluation of Thermal Stability and Charge/Discharge Characteristics)

Evaluation Example 1: Thermogravimetric Analysis (TGA) Evaluation

Figure 7A:
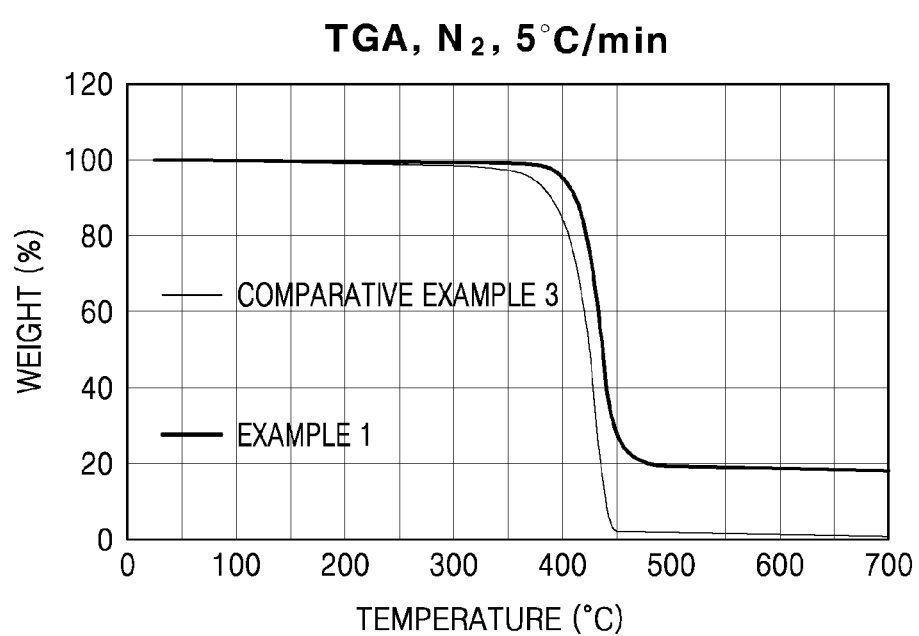
FIG. 7A is a graph of weight percent (%) versus temperature (° C.), showing the results of thermogravimetric analysis (TGA) of a carbon-based material and an ionic liquid respectively included in cathodes for a lithium air battery that are manufactured according to Example 1 and Comparative Example 3, in which the TGA experiment is performed in a nitrogen atmosphere at a heating rate of 5° C./min.
Figure 7B:
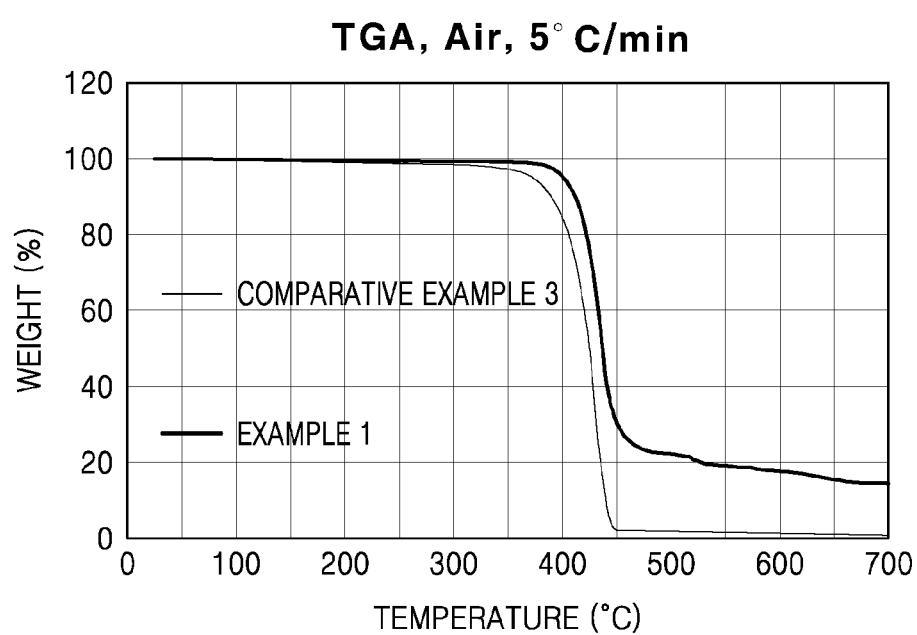
FIG. 7B is a graph of weight percent (%) versus temperature (° C.) showing the results of TGA analysis of a carbonaceous material and an ionic liquid respectively included in the cathodes for a lithium air battery that are manufactured according to Example 1 and Comparative Example 3, in which the TGA experiment is performed in an atmospheric atmosphere and at a heating rate of 5° C./min.

A TGA experiment was carried out on the carbonaceous material and the ionic liquid respectively included in the cathodes for a lithium air battery of Example 1 and Comparative Example 3 at a heating rate of 5° C./min each in a nitrogen atmosphere and in air. The results are illustrated in FIGS. 7A and 7B.

In the TGA experiment, TA(SDT: TGA+DSC) 2010 TGA/DSC1 (from METTLER TOLEDO) (temperature range: 0° C. to 700° C.) was used.

5 weight percent (wt %) loss temperatures $T_d$ of the carbonaceous material and the ionic liquid are shown in Table 1.

TABLE 1

| | Nitrogen atmosphere, $T_d$ (° C.) | Air, $T_d$ (° C.) |
|---|---|---|
| Example 1 | 413 | 401 |
| Comparative Example 3 | 380 | 370 |

Referring to FIGS. 7A and 7B and Table 1, the carbonaceous material included in the cathode for a lithium air battery of Example 1 had 5 wt % greater weight loss than the ionic liquid included in the cathode for a lithium air battery of Comparative Example 3 in a nitrogen atmosphere and also in air.

From the results above, it is confirmed that the carbonaceous material included in the cathode of Example 1 has higher thermal stability than the ionic liquid included in the cathode of Comparative Example 3.

Evaluation Example 2: Charge/Discharge Characteristics Evaluation

Charge/discharge characteristics experiment was performed such that each of the lithium air batteries of Examples 5 and 6 and Comparative Examples 4 and 5 was discharged at a constant current of 0.24 mA/cm$^2$ at 60° C. and 1 atmosphere (atm) in an oxygen atmosphere until the voltage reached 1.8 V (vs. Li), charged at the same constant current up to 4.15 V, and then charged at a constant voltage until the current reached 0.02 mA/cm$^2$.

To evaluate the charge/discharge characteristics, a charger/discharger (TOSCAT, series 3100, Japan) was used.

A Coulombic efficiency is defined by Equation 1 and calculated using TOSCAT Series Data Plot Program, Ver. 8.3.24 software. Cyclability is defined as the number of cycles.

Figure 8:
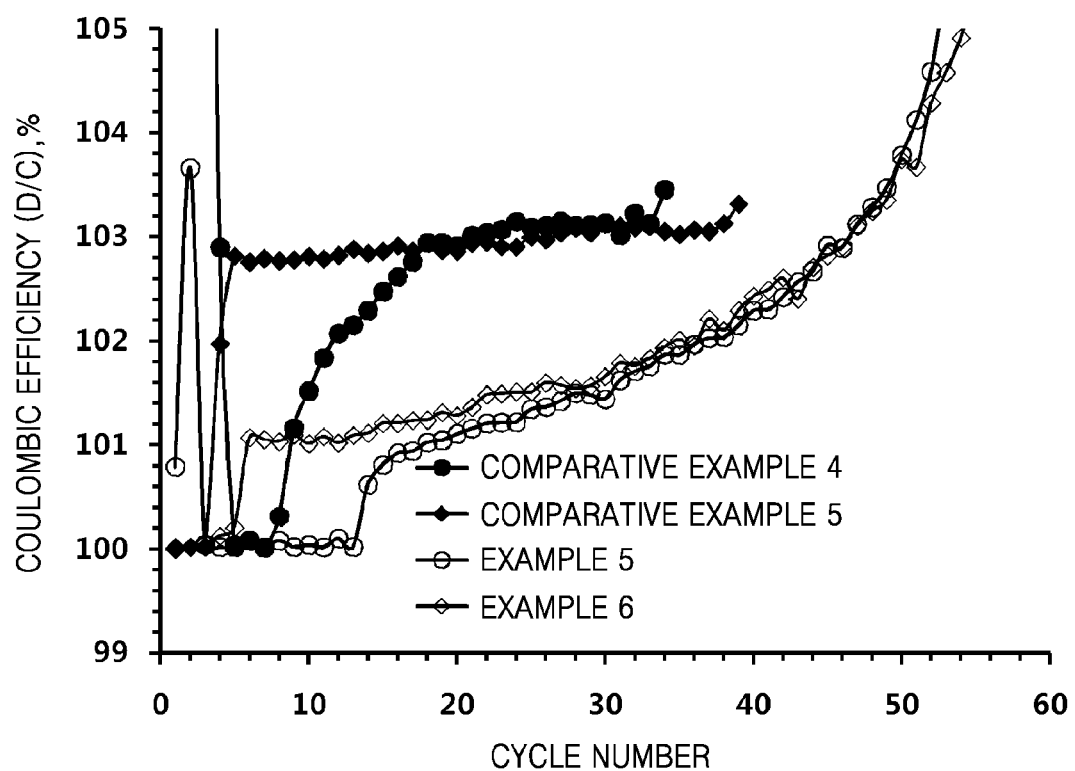
FIG. 8 is a graph of coulombic efficiency (discharge capacity divided by charge capacity, percent (%)) versus cycle number showing a Coulombic efficiency and cyclability of each of the lithium air batteries manufactured according to Examples 5 and 6 and Comparative Examples 4 and 5.

A part (Coulombic efficiency at 30$^{th}$ cycle) of the results is shown in Table 2 and FIG. 8.

Coulombic efficiency (%)=[(discharge capacity at each cycle/charge capacity at each cycle)]× 100%   Equation 1

In Equation 1, a unit weight at discharge capacity and charge capacity denotes the weight of a cathode including a carbonaceous material, a lithium salt, and an electrolyte.

TABLE 2

| | Coulombic efficiency at 30th cycle (%) | Cyclability (number of cycles) |
|---|---|---|
| Example 5 | 101.4 | 54 |
| Example 6 | 101.7 | 55 |
| Comparative Example 4 | 103.1 | 39 |
| Comparative Example 5 | 103.1 | 34 |

Referring to FIG. 8 and Table 2, it is confirmed that the lithium air batteries of Examples 5 and 6 have enhanced Coulombic efficiency at 60° C., i.e., nearly 100.0%, as compared to the lithium air batteries of Comparative Examples 4 and 5.

In addition, it is confirmed that the lithium air batteries of Examples 5 and 6 have enhanced cyclability at 60° C. as compared to the lithium air batteries of Comparative Examples 4 and 5.

As is apparent from the foregoing description, a cathode includes a carbonaceous material including, on a carbonaceous core, a coating layer including amorphous polysilsesquioxane ionic liquid having a viscosity (n) of at least 0.2 mPa·s in an aprotic solvent at 30° C. and thus a lithium air battery including the cathode may have enhanced thermal stability and charge/discharge characteristics at high temperatures.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A cathode for a lithium air battery comprising a carbonaceous material, the carbonaceous material comprising:
   a carbonaceous core; and
   a coating layer on the carbonaceous core,
   wherein the coating layer comprises an amorphous polysilsesquioxane ionic liquid, wherein the amorphous polysilsesquioxane ionic liquid has a viscosity of at least 0.2 milliPascal-seconds as measured as a 10 weight percent solution in acetone at 30° C.

2. The cathode of claim 1, wherein the amorphous polysilsesquioxane ionic liquid has a viscosity of about 0.2 milliPascal-seconds to about 1200 milliPascal-seconds as measured as a 10 weight percent solution in acetone at 30° C.

3. The cathode of claim 1, wherein the amorphous polysilsesquioxane ionic liquid is a ladder type amorphous polysilsesquioxane ionic liquid.

4. The cathode of claim 1, wherein the amorphous polysilsesquioxane ionic liquid is represented by Formula 1:

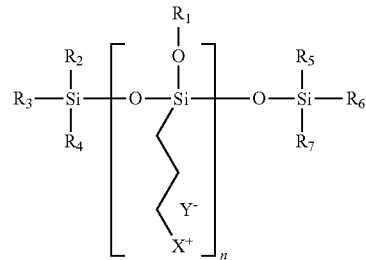

Formula 1 wherein n is an integer from 1 to 20,
each of $R_1$ to $R_7$ is independently hydrogen, a hydroxyl group, a substituted or unsubstituted organic functional group, a substituted or unsubstituted silicon functional group, or a combination thereof,
$X^+$ is a quaternary nitrogen-containing cation functional group,
$Y^-$ is $(CF_3SO_2)_2N^-$, $(C_2F_5SO_2)_2N^-$, $CF_3SO_3^-$, an anion represented by Formula 1-1, or a combination thereof,

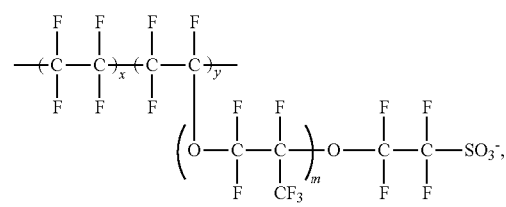

Formula 1-1 wherein x is an integer from 0 to 15,
y is an integer from 0 to 1000, and
m is an integer of 1 or more.

5. The cathode of claim 4, wherein, in Formula 1, the quaternary nitrogen-containing cation functional group comprises a quaternary nitrogen-containing cation of Formulas 2A to 2F, or a combination thereof:

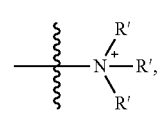

Formula 2A

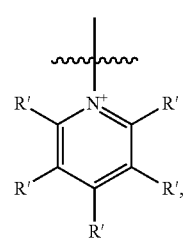

Formula 2B

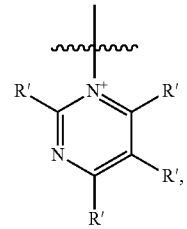

Formula 2C

-continued

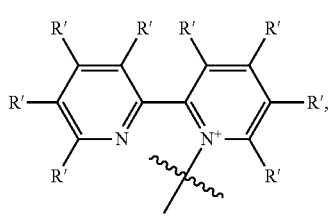
Formula 2D

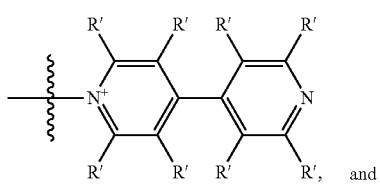
Formula 2E

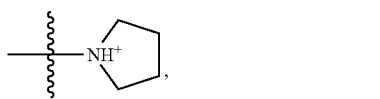
Formula 2F and wherein each R' is independently a hydrogen atom, a hydroxyl group, a substituted or unsubstituted $C_1$-$C_{20}$ alkyl group, a substituted or unsubstituted $C_6$-$C_{20}$ aryl group, a substituted or unsubstituted $C_2$-$C_{20}$ alkenyl group, a substituted or unsubstituted $C_3$-$C_{10}$ cycloalkyl group, a substituted or unsubstituted $C_1$-$C_{20}$ alkyleneoxide group, a substituted or unsubstituted acrylate group, a substituted or unsubstituted methacrylate group, or a combination thereof.

6. The cathode of claim 4, wherein, in Formula 1, each of $R_1$ to $R_7$ is independently a hydrogen atom, a hydroxyl group, a substituted or unsubstituted $C_1$-$C_{20}$ alkyl group, a substituted or unsubstituted $C_2$-$C_{20}$ alkenyl group, a substituted or unsubstituted $C_3$-$C_{20}$ cycloalkyl group, a substituted or unsubstituted $C_6$-$C_{20}$ aryl group, a substituted or unsubstituted $C_1$-$C_{20}$ alkyleneoxide group, a substituted or unsubstituted acrylate group, a substituted or unsubstituted methacrylate group, or a combination thereof.

7. The cathode of claim 1, wherein the amorphous polysilsesquioxane ionic liquid is represented by Formula 3:

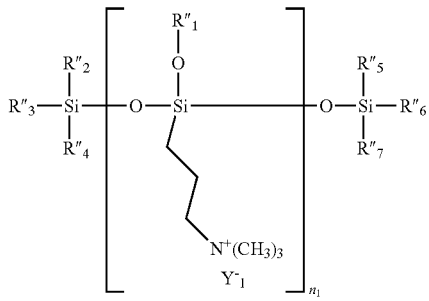
Formula 3 wherein $n_1$ is an integer from 1 to 20,
each of $R''_1$ to $R''_7$ is independently a hydrogen atom, a hydroxyl group, a substituted or unsubstituted $C_1$-$C_{20}$ alkyl group, a substituted or unsubstituted $C_2$-$C_{20}$ alkenyl group, a substituted or unsubstituted $C_3$-$C_{20}$ cycloalkyl group, a substituted or unsubstituted $C_6$-$C_{20}$ aryl group, a substituted or unsubstituted $C_1$-$C_{20}$ alkyleneoxide group, a substituted or unsubstituted acrylate group, a substituted or unsubstituted methacrylate group, or a combination thereof, and
$Y_1^-$ is $(CF_3SO_2)_2N^-$, $(C_2F_5SO_2)_2N^-$, $CF_3SO_3$, the anion of Formula 1-1, or a combination thereof,

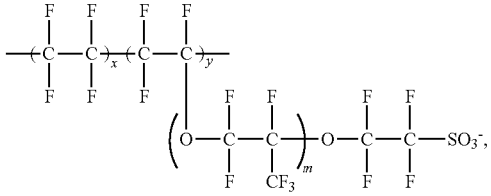
Formula 1-1 wherein x is an integer from 0 to 15,
y is an integer from 0 to 1000, and
m is an integer of 1 or more.

8. The cathode of claim 1, wherein the amorphous polysilsesquioxane ionic liquid has a weight average molecular weight of greater than about 1,800 Daltons to about 5,000 Daltons.

9. The cathode of claim 1, wherein the amorphous polysilsesquioxane ionic liquid has a gel phase at 60° C.

10. The cathode of claim 1, wherein an amount of the coating layer is from about 1 weight percent to about 30 weight percent, based on a total weight of the cathode.

11. The cathode of claim 1, wherein the coating layer is in a form of a continuous coating or an island coating.

12. The cathode of claim 1, wherein the carbonaceous core comprises carbon nanotubes.

13. The cathode of claim 1, wherein the carbonaceous core comprises porous multi-walled carbon nanotubes.

14. The cathode of claim 1, further comprising a binder.

15. A lithium air battery comprising:
the cathode according to claim 1;
an anode capable of intercalating and deintercalating lithium; and
an electrolyte disposed between the cathode and the anode.

16. A method of manufacturing a cathode for a lithium air battery, the method comprising:
obtaining a mixture of a polysilsesquioxane precursor and a first solvent;
drying the mixture of the polysilsesquioxane precursor and the first solvent to obtain an amorphous polysilsesquioxane ionic liquid;
adding a carbonaceous core and a second solvent to the amorphous polysilsesquioxane ionic liquid to provide a solution;
drying the solution to manufacture a carbonaceous material comprising
a carbonaceous core, and
a coating layer on the carbonaceous core, wherein the coating layer comprises an amorphous polysilsesquioxane ionic liquid having a viscosity of at least 0.2 milliPascal-seconds as measured as a 10 weight percent solution in acetone at 30° C.; and
disposing the carbonaceous material and a binder on a substrate to manufacture the cathode.

17. The method of claim 16, wherein the obtaining comprises hydrolyzing and condensing the polysilsesquioxane precursor in the first solvent to obtain the amorphous polysilsesquioxane ionic liquid.

18. The method of claim 16, wherein the polysilsesquioxane precursor comprises 3-(trimethoxysilyl)propyl-N,N,N-trimethylammonium chloride, and N,N-bis(trifluoromethanesulfonyl)imide, N,N-bis(trifluoroethanesulfonyl)imide, a compound represented by Formula 1-2, or a combination thereof:

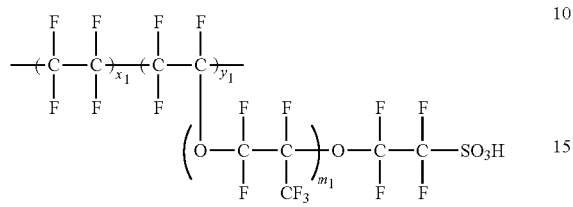

Formula 1-2 wherein $x_1$ is an integer from 3 to 5,
$y_1$ is an integer from 100 to 1000, and
$m_1$ is an integer of 1 or more.

19. The method of claim 16, wherein the first solvent comprises methanol and water.

20. The method of claim 19, wherein a volume ratio of the methanol to the water is about 2:1 to about 6:1.

* * * * *